United States Patent [19]
DeYoung

[11] Patent Number: 5,975,932
[45] Date of Patent: Nov. 2, 1999

[54] LANGUAGE WHEEL

[76] Inventor: Lee DeYoung, 6726 Monero Dr., Rancho Palos Verde, Calif. 90275

[21] Appl. No.: 09/267,735

[22] Filed: Mar. 15, 1999

Related U.S. Application Data

[60] Provisional application No. 60/078,062, Mar. 16, 1998.

[51] Int. Cl.[6] .................................................. G09B 1/18
[52] U.S. Cl. ......................... 439/174; 434/167; 434/157
[58] Field of Search .................................. 434/112, 156, 434/157, 161, 167, 174, 176, 181

[56] References Cited

U.S. PATENT DOCUMENTS

| | | | |
|---|---|---|---|
| 1,329,896 | 2/1920 | Frome ...................................... | 434/157 |
| 1,541,707 | 6/1925 | Hanback .............................. | 434/167 X |
| 2,322,564 | 6/1943 | Buckley et al. ......................... | 434/174 |
| 3,199,227 | 8/1965 | King ......................................... | 434/167 |
| 3,199,228 | 8/1965 | Rubin ....................................... | 434/167 |
| 3,468,037 | 9/1969 | Warnecke ................................. | 434/347 |
| 3,762,071 | 10/1973 | Coffman et al. ......................... | 434/174 |
| 3,783,531 | 1/1974 | Kattenhorn .............................. | 434/181 |
| 4,014,113 | 3/1977 | Bowman .................................. | 434/167 |

*Primary Examiner*—Sam Rimell
*Attorney, Agent, or Firm*—Allen A. Dicke, Jr.

[57] ABSTRACT

The language wheel has an interchangeable "wheel" with the same words of two languages in corresponding positions on the wheel. Two cursors are coupled together so the when one is manually moved to indicate a particular word, the other indicates the corresponding word. The two cursors are mounted on a pivoted bar which rotates above the language wheel and the cursors move radially in and out on the bar.

20 Claims, 4 Drawing Sheets

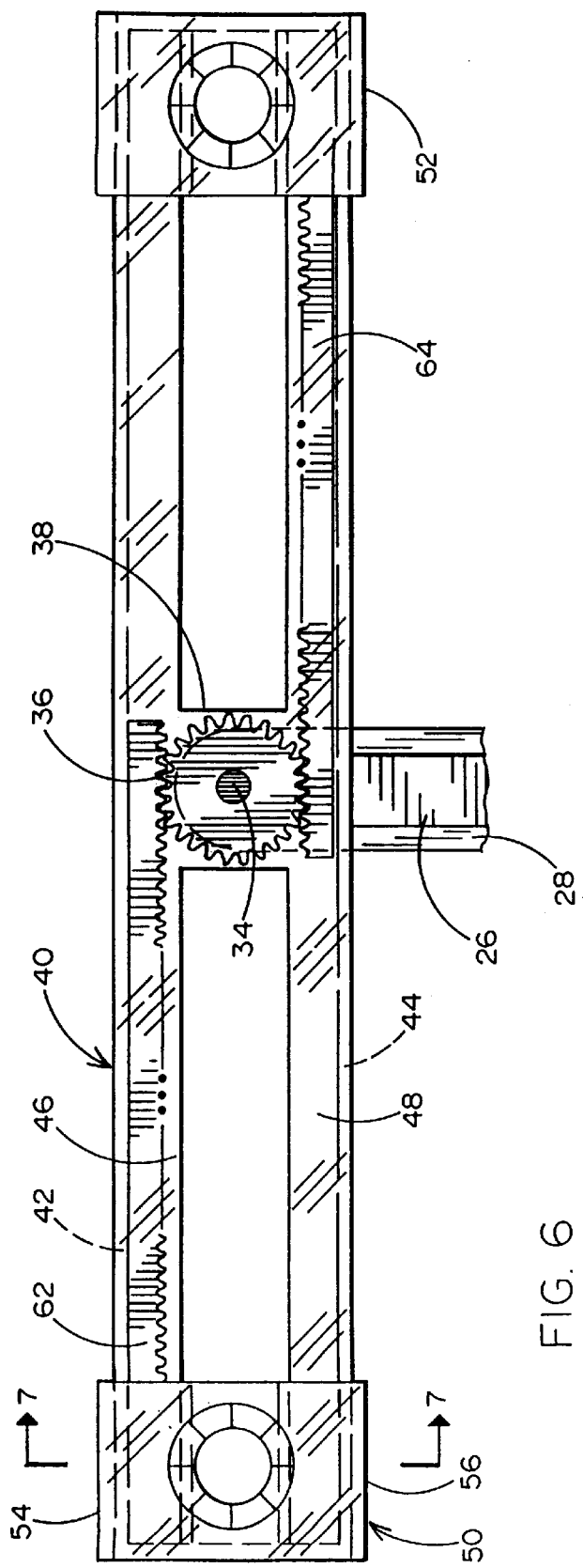
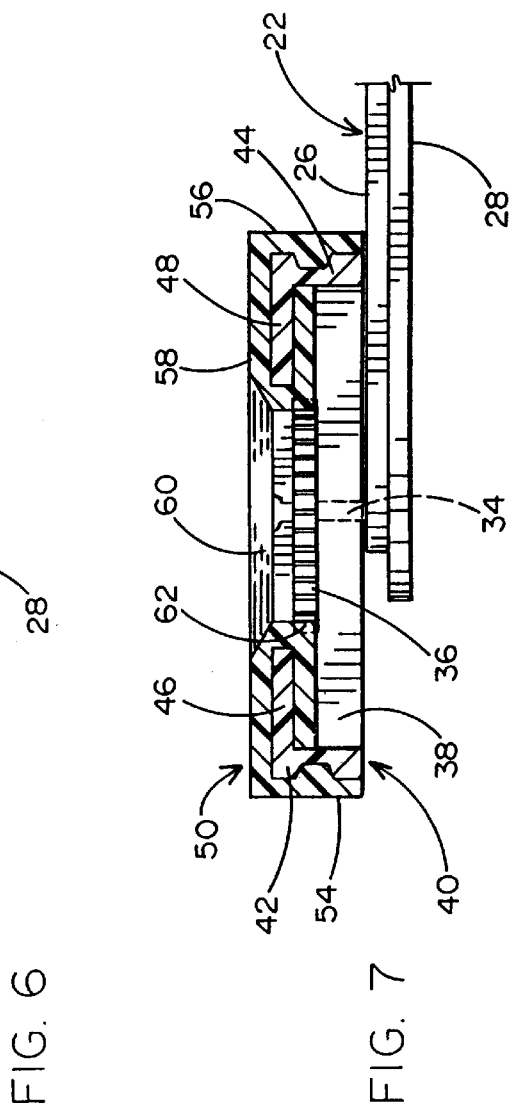
FIG. 6
FIG. 7

LANGUAGE WHEEL

CROSS-REFERENCE

This application relies for priority upon Provisional Application Ser. No. 60/078,062, filed Mar. 16, 1998, for "Language Wheel."

FIELD OF THE INVENTION

This invention is directed to a system for foreign language communication and education which employs a language wheel with two languages thereon in corresponding positions on the wheel, together with cursors which are movable in related manner to indicate two words having the same meaning in the two different languages.

BACKGROUND OF THE INVENTION

The most satisfactory, most accurate and fastest communication between two persons is when they utilize the same language. Without commonality of language, only very rudimentary communication is possible. This is true when two people need to interact with each other, and it is also true when the two interacting persons are attempting to learn each other's language. There is need for a device which, at low technology levels, can indicate corresponding words in different languages.

SUMMARY OF THE INVENTION

In order to aid in the understanding of this invention, it can be said in essentially summary form that it is directed to a language translating device which has a panel having corresponding words in two different languages. The device has two cursors which move in coordination to each other so that when one indicates a word in one language, the other indicates the word of corresponding meaning in the other language.

It is thus a purpose and advantage of this invention to provide a language device which can aid in the interaction between two users having different languages.

It is another purpose and advantage of this invention to utilize a language wheel system where discs carrying words in two languages in corresponding positions thereon can be used for communication in those two languages, and another disc can be placed therein to use the same language wheel system with further different languages.

It is a further purpose and advantage of this invention to provide a language wheel which can also be used as a system for self-study guide for a person to improve his own language or to learn to speak a foreign language.

It is another purpose and advantage of this invention to provide a system which is portable, does not require electric power or batteries, and which is capable of being used with different language wheels to make it versatile in other languages so that learning and teaching another language can be easily and economically implemented.

Other purposes and advantages of this invention will become apparent from a study of the following portion of the specification, the claims and the attached drawings.

BRIEF DESCRIPTION OF THE DRAWINGS

FIG. 6 is an enlarged view of the cursor carrier and the two cursors thereon.

FIG. 7 is an enlarged view taken generally along line 7—7 of FIG. 6.

DESCRIPTION OF THE PREFERRED EMBODIMENT

Figure 1:
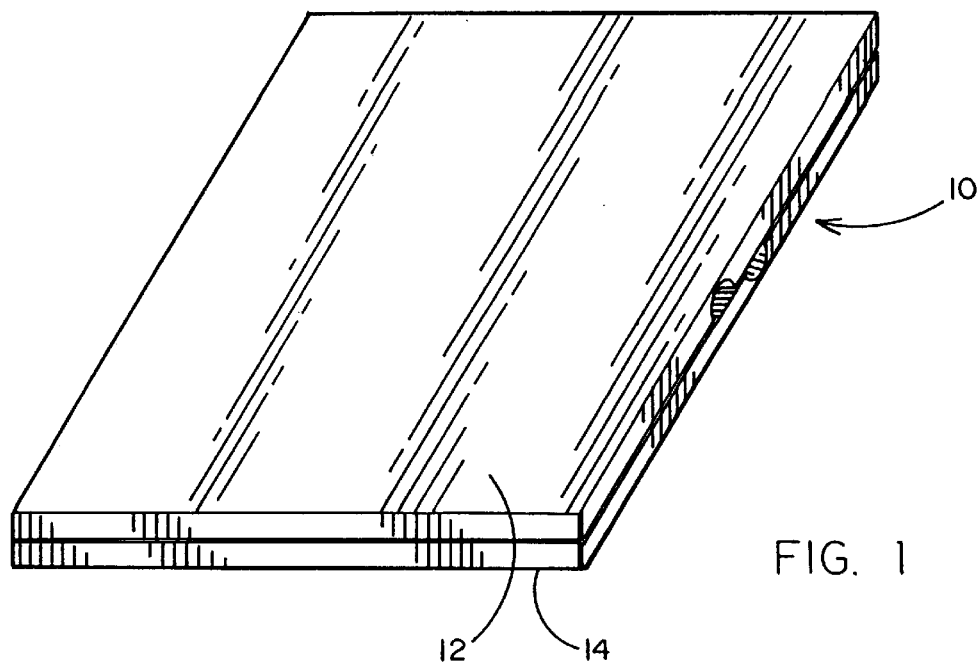
FIG. 1 is a perspective view of two language wheels in one case, with the case being closed.
Figure 2:
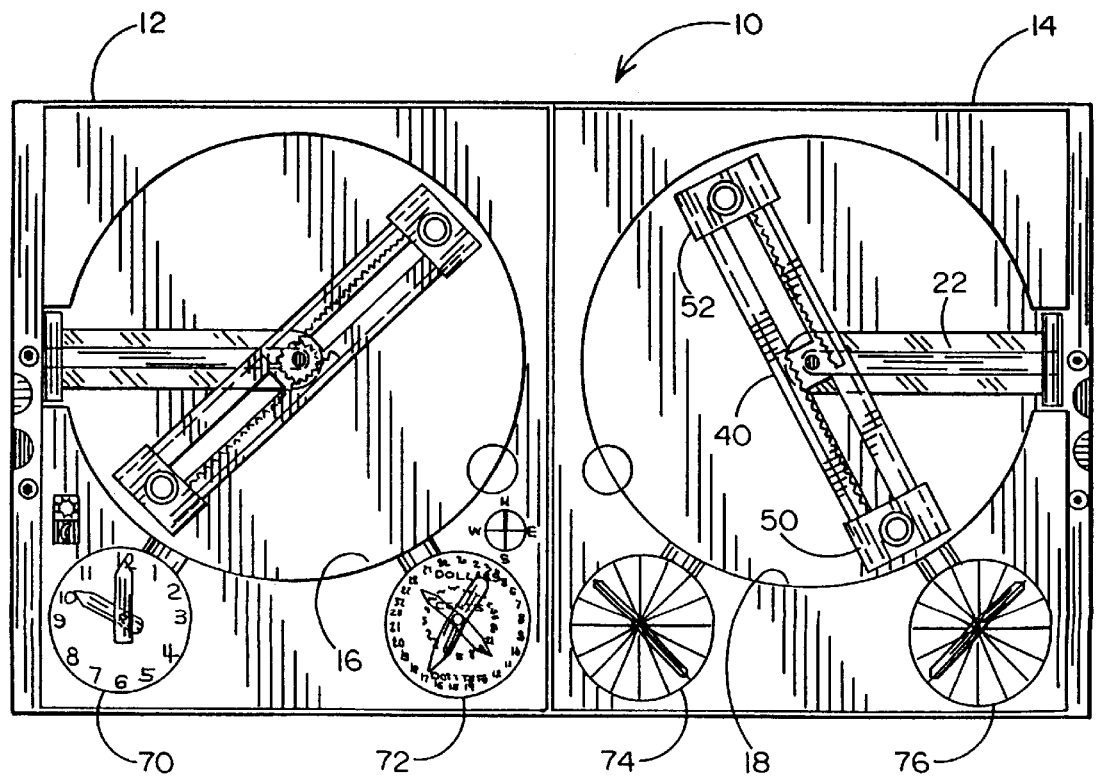
FIG. 2 is a plan view of the case in the open position.
Figure 3:
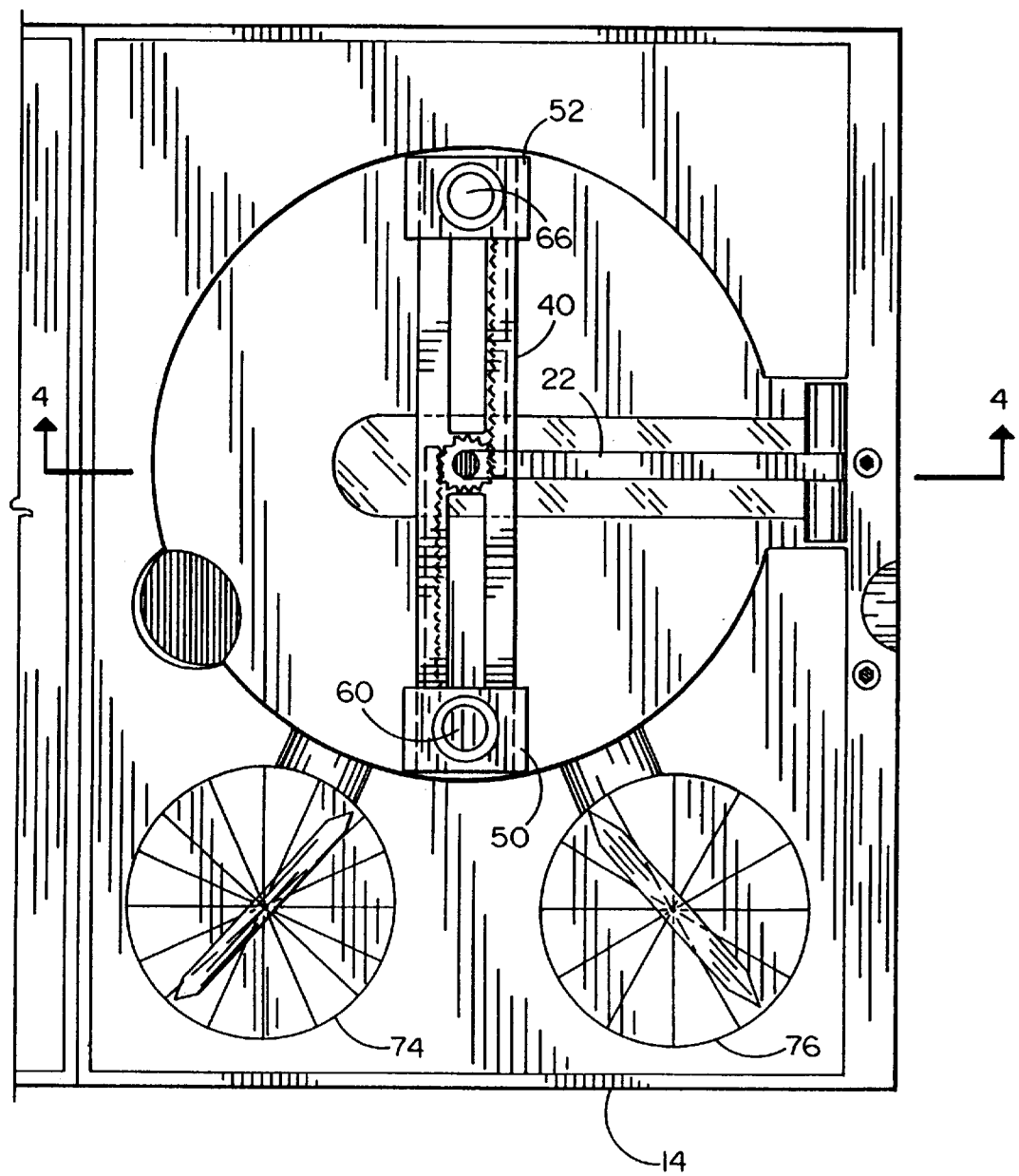
FIG. 3 is an enlarged view of the right half of the case, with the left half being broken away.
Figures 4, 5:
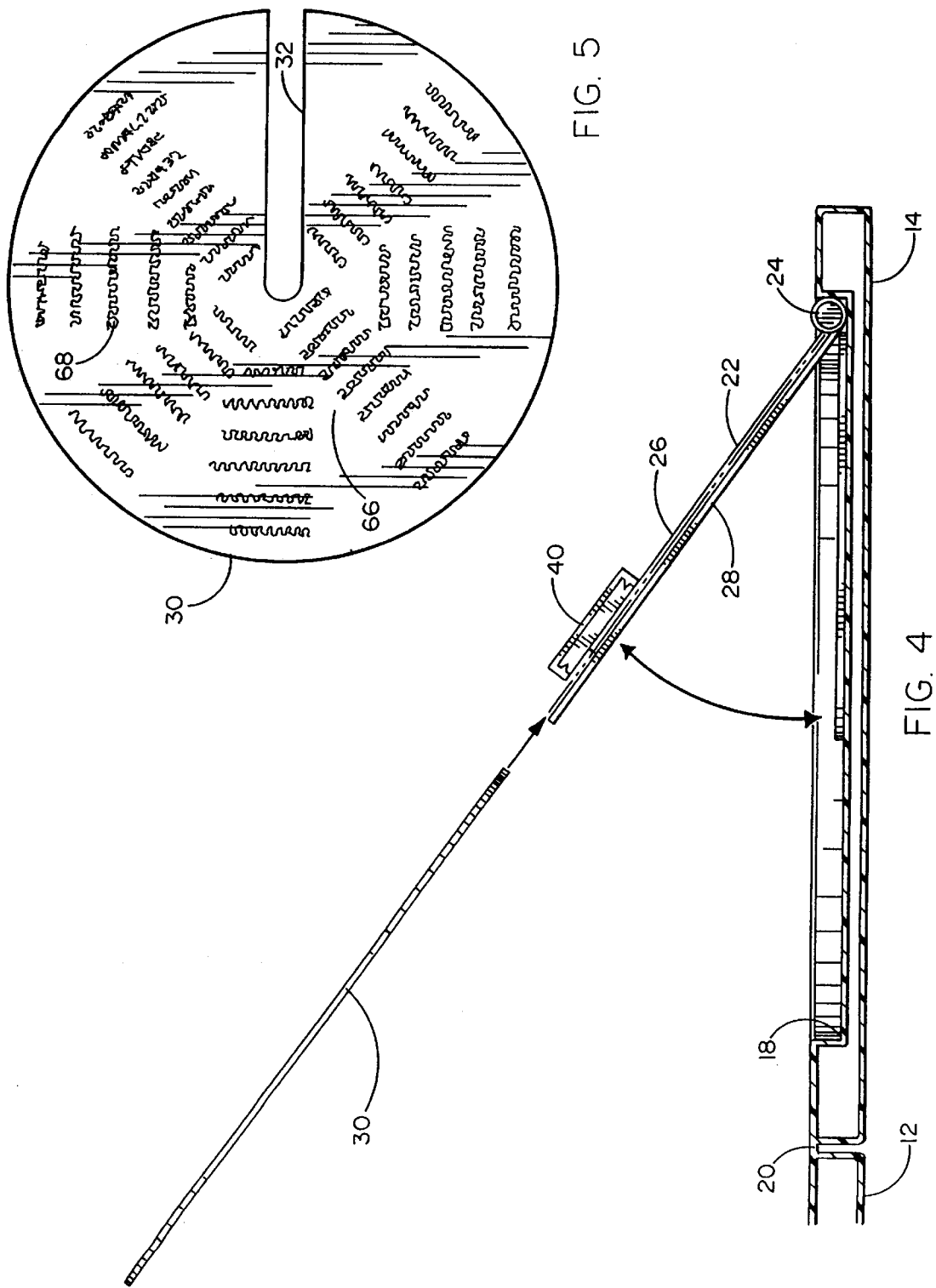
FIG. 4 is an enlarged section taken generally along line 4—4 of FIG. 3, showing the wheel support arm in the raised position.
FIG. 5 is a plan view of one of the language wheels.

The language wheel of this invention has a case 10 which has left and right case halves 12 and 14, which lie flat when opened, as seen in FIGS. 2, 3 and 4. The case 10 is a preferred embodiment of a base for the language wheel structure. As will be apparent in the following description, the language wheel may be larger and can occupy a reasonable number of words on one language wheel. However, for the sake of portability and convenience, in the preferred embodiment, the language wheel is made smaller and two are incorporated into one case. The use of two wheels in the one case permits them to be small and still have an adequate vocabulary. When open, it is seen that there is a recess in each of the case halves. In FIG. 2, these recesses are indicated at recesses 16 and 18. Each of the recesses contains a language wheel in accordance with this invention. Usually the two wheels will have different words of the same language thereon. Since they are symmetrically identical around the hinge 20 between the case halves, only the language wheel in recess 18 will be described. The other language wheel is the same, except for having different words.

Referring principally to FIGS. 2, 3 and 4, wheel support arm 22 is hinged on its right end on hinge 24. The wheel support arm has an upper narrower guide 26 and a lower wider cap 28 to form an inverted tee. Language wheel 30 is a flexible sheet of synthetic polymer composition material which carries thereon word sets. The language wheel is circular, and it is a slightly smaller size then the diameter of the circular recess 18. The language wheel has a slot 32 which extends from the front edge inward beyond the center. The slot is slightly wider than the narrow guide portion 26 of the wheel support arm and is smaller than the width of the cap. When wheel support arm 22 is raised, as seen in FIG. 4, the language wheel can be slid onto the wheel support arm. FIG. 4 shows the projected position of the language wheel when it is about to be inserted onto the end of the wheel support arm.

As will be described hereinafter, the language wheel has a top surface on which there are markings corresponding to two different languages. The language wheel is thin and flexible and is well protected when it is in the case. The wheel does not rotate because its slot 32 is engaged on arm 22, but is called a wheel because of its circular nature. It is circular only for convenience and can be shaped with other outlying configuration. The recess 18 is sufficiently deep below the arm 22 when it is closed to be able to store several extra language wheels.

Pivot pin 34, see FIG. 7, is secured to the end of wheel support arm 22 and is fixed thereto. It extends upwardly and carries gear 36 rotatably mounted thereon. Cross bar 38 is pivotally mounted on the pivot pin 34. Cross bar 38 is a cross bar in cursor carrier 40. As is best seen in FIG. 7, the cursor carrier 40 is an elongated structure having outer rails 42 and 44 and inward flanges 46 and 48. At the center, the rails are attached together by means of cross bar 36. There are similar cross bars at the ends of the cursor carrier.

Cursor 50 is shown in cross section in FIG. 7. Cursor 52 has the same cross section. Cursor 50 has finger grasp flanges 54 and 56, which extend down around the outside of the outer rails 42 and 44. Cursor 50 has a face 58 through which there is a window or viewing aperture 60. In some cases, the window may contain a planar-convex lens. Outside the window, the body extends down past the inwardly directed flanges 46 and 48 and carries a rack 62, which engages gear 36. The grasp flanges 54 and 56 permit manual grasp of the cursors so that the cursors can be moved radially inward and outward on the cursor carrier 40. The cursor 52 also has an inwardly directed rack 64, which also engages gear 36. This means that, when one of the cursors moves radially outward, the other must also move outward the same distance.

Cursor 52 has a window 66. The operator of the language wheel can grasp either or both cursors to move them both radially inward or outward, but can also rotate the cursor arms about the pivot pin 34. Thus, the entire face area of the language wheel 30 can be covered. Words are placed on the language wheel so that equivalent wheels in different languages are seen in the two windows of the two cursors. The purpose is to pinpoint in each of the windows the desired word to be communicated in the home language and the foreign language simultaneously with the utilization of the two cursors. Their windows act as highlighters of particular corresponding words on the face of the language wheel. As the user rotates the cursor carrier and radially moves the cursor carrier inward or outward to the desired word or phrase, the other window slides to the exact opposite side of the circle to the corresponding word in the foreign language.

FIG. 5 illustrates, for example, that a radially spaced group of English words 66 may be placed on the language wheel, and a corresponding set 68 of foreign words are positioned radially opposite each other. The words are such that, at equal radii, the words have the same meaning. The exact placement of the two windows in the two cursors is critical so that the opposite words in the two languages are precisely indicated.

In addition, the language wheel system can be made in different sizes. A portable unit is shown with two wheels in a folding case. If transportability is not a problem, a much larger wheel can be employed so that there is need for only one wheel to accommodate an adequate number of words. The same basic system can be used for communication in any two languages simply by changing the language wheel. The language wheel can be used as a system for self-study of a foreign language or can be used with two persons working together to communicate through the language wheel as a translation device. In addition to normal translation, the system can be used in the health care field by the aphasic, stroke patients who cannot speak and by profoundly hearing impaired. The text would be a mirror image of the same language on the wheel.

In addition to the basic utilization, FIGS. 2 and 3 also show clock 70, coinage equivalent dial 72, symbol translator dial 74 and a dial 76 for simple situations like yes/no, "I do not speak your language." Those dials could alternatively provide celsius/fahrenheit temperature translation, foot/meter length translation, or similar equivalents.

This invention has been described and it is presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A language translator aid comprising:
    a language panel for carrying thereon in related locations words of first and second languages having similar meaning;
    a base for holding said language panel;
    a cursor carrier mounted on said base to move in a first direction with respect to said language panel; and
    first and second cursors mounted on said carrier, said first and second cursors being connected to each other so that when said first cursor is moved on said cursor carrier, said second cursor also moves in a corresponding distance and direction so that when said first cursor indicates a word of the first language, said second cursor indicates a similar word of the second language.

2. The language translator aid of claim 1 wherein said cursors are coupled together.

3. The language translator aid of claim 2 wherein said cursors are connected together by means of a first rack connected to said first cursor and a second rack connected to said second cursor, both said first and second racks engaging a gear.

4. The language translator aid of claim 1 wherein each said cursor has an opening therethrough and the words on the language panel are read through said openings.

5. The language translator aid of claim 3 wherein each said cursor has an opening therethrough and the words on the language panel are read through said openings.

6. The language translator aid of claim 1 wherein said base is a case with a cover so that said cover can be closed over said language panel and said cursor carrier when it is unneeded.

7. The language translator aid of claim 6 wherein a second language panel and a second cursor carrier are mounted in said cover so that when said cover is open said first and second language panels lie adjacent each other.

8. The language translator aid of claim 1 wherein said language panel is substantially circular and said cursor carrier is pivotally mounted so as to rotate substantially on the circular axis of said language panel.

9. The language translator aid of claim 8 wherein said first and second carriers are mounted on said cursor carrier to move radially with respect to said axis.

10. The language translator aid of claim 9 wherein said cursors are coupled together so that when one is moved in a direction of increasing radius, the other also moves in a direction of increasing radius.

11. The language translator aid of claim 10 wherein in addition to said language panel and said cursor carrier, said base carries a double-arrowed dial indicating equivalent words.

12. A language translator aid comprising:
    a base;
    a language panel mounted on said base, said language panel having a face, said face of said language panel carrying a first set of words in a first language and a second set of words in a second language;
    first and second cursors movably mounted on said base, said first and second cursors being connected together so that they move in a coordinated motion with respect to each other, said first and second cursors each having structure thereon for indicating a particular word on said face of said language panel, said words on said language panel being arranged in such a manner that when said first cursor is positioned to indicate a particular word in said first set of words, said second cursor is positioned to indicate a word of similar meaning in said second set of words.

13. The language translator aid of claim 12 wherein said language panel is interchangeable so that different groups of words in first and second languages can be introduced to the language translator aid by changing said language panel.

14. The language translator aid of claim 12 wherein there is a cursor carrier mounted to move with respect to said base and said first and second cursors are mounted on said cursor carrier.

15. The language translator aid of claim 14 wherein said cursor carrier is pivotally mounted and said cursors are mounted on said cursor carrier so that they move radially with respect to said pivot mounting of said cursor carrier.

16. The language translator aid of claim 15 wherein said first and second cursors are connected together on said cursor carrier so that when said first cursor is radially moved, said second cursor is radially moved the same distance.

17. The language translator aid of claim 16 wherein said first and second cursors are connected together by means of rack and gear so that when said first cursor is moved toward an increased radius, said second cursor moves toward an increased radius.

18. The language translator aid of claim 17 wherein said language panel is interchangeable so that different groups of words in first and second languages can be introduced to the language translator aid by changing said language panel.

19. The language translator aid of claim 12 wherein there is storage within said base for storage of additional language panels.

20. The language translator aid of claim 19 wherein said base has an openable cover mounted thereon so that said cover can overlie said language panel and said cursors during non-operation.

* * * * *